United States Patent
Yuet et al.

(10) Patent No.: US 11,238,833 B2
(45) Date of Patent: Feb. 1, 2022

(54) METHODS AND SYSTEMS FOR DISPLAY SCREENS WITH RELATIVE COORDINATE SYSTEMS

(71) Applicant: Caterpillar Inc., Deerfield, IL (US)

(72) Inventors: Fu P. Yuet, Cypress, TX (US); Meghna Prasad, Peoria, IL (US); Keith R. Folken, West Peoria, IL (US); Merritt P. Callaghan, Cypress, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/882,949

(22) Filed: May 26, 2020

(65) Prior Publication Data

US 2021/0375237 A1    Dec. 2, 2021

(51) Int. Cl.
*G09G 5/373* (2006.01)
*G09G 5/38* (2006.01)

(52) U.S. Cl.
CPC ............. *G09G 5/373* (2013.01); *G09G 5/38* (2013.01); *G09G 2354/00* (2013.01)

(58) Field of Classification Search
CPC ....... G09G 5/373; G09G 5/38; G09G 2354/00
See application file for complete search history.

(56) References Cited

U.S. PATENT DOCUMENTS

| | | |
|---|---|---|
| 5,796,401 A | 8/1998 | Winer |
| 8,095,306 B2 | 1/2012 | Villalobos et al. |
| 8,402,381 B2 | 3/2013 | Berg et al. |
| 8,726,186 B2 | 5/2014 | Grosz et al. |
| 9,019,128 B1 * | 4/2015 | Kim ................. G01C 23/00 340/945 |
| 2013/0167080 A1 | 6/2013 | Ari et al. |
| 2015/0084857 A1 * | 3/2015 | Kimura ............. G02B 27/017 345/156 |
| 2015/0116349 A1 * | 4/2015 | Hamada ............. G06K 9/46 345/619 |
| 2017/0078504 A1 * | 3/2017 | Nagata ............. G03G 15/5016 |
| 2018/0088783 A1 | 3/2018 | Anand et al. |
| 2021/0191609 A1 * | 6/2021 | Tappan ............. G06F 3/0488 |

FOREIGN PATENT DOCUMENTS

| | | |
|---|---|---|
| CN | 106325678 A | 1/2017 |
| KR | 10-0942821 B1 | 2/2010 |

* cited by examiner

*Primary Examiner* — Samantha (Yuehan) Wang
(74) *Attorney, Agent, or Firm* — Bookoff McAndrews PLLC

(57) ABSTRACT

A graphical user interface (GUI) of a display screen connected to a machine and, more particularly, to GUIs of one or more display screens that have a relative coordinate system to display parameter information from one or more connected machines. The GUI may include one or more display screens associated with a data bus for a machine, one or more data storage devices for storing processor readable instructions, and at least one processor configured to perform operations stored on the one or more data storage devices. The at least one processor may be configured to receive operations data from the data bus for the machine, extract parameter information from the operations data, and generate the GUI. The GUI may depict a plurality of parameter elements, wherein the plurality of parameter elements are arranged and scaled according to the extracted parameter information, arrangement rules, and display screen resolution.

20 Claims, 13 Drawing Sheets

METHODS AND SYSTEMS FOR DISPLAY SCREENS WITH RELATIVE COORDINATE SYSTEMS

TECHNICAL FIELD

The present disclosure relates generally to an improved graphical user interface (GUI) for a display screen and, more particularly, to GUIs of display screens connected to machines utilizing a relative coordinate system to display parameter information from the machines.

BACKGROUND

A GUI may be implemented on a display for a machine (e.g. a generator, engine, turbine, vehicle, and the like) in order to display parameter information of the machine to a user. The GUI may include widgets (i.e., graphical displays of parameter elements), each widget corresponding to a particular machine parameter, where each widget may be arranged on the screen based on hardcoded pixel coordinates. However, because the same GUI software may be implemented on multiple different displays (where each display may have a different resolution and/or screen size), hardcoded widgets may cause the GUI to not completely fill the screen of the display, resulting in areas of unused blank space on the display screen.

Further, in addition to different displays, the same GUI software may also be implemented across different machine applications (for example, different engines, different gensets, different transmissions, and so forth), but these different machine applications might not support the same types of parameters. As a result, GUI software applied to multiple different machine applications may display a GUI with one or more widgets for an unsupported parameter accompanied by an indicator (for example, a "---" or "n/a") instead of a parameter value obtained from the machine. The GUI software may also hide one or more widgets corresponding to unsupported parameters entirely, resulting in a blank space or gap on the display screen between widgets.

Accordingly, the resulting displays create the appearance of malfunctioning software, which may result in user confusion or error. One potential way to address this technical problem is to hardcode multiple GUIs for every possible machine application and for every possible display resolution. However, such a solution is inefficient, and would require significant development effort and computing resources, resulting in increased administrative burden, operations cost, and computing and data storage loads across all systems.

U.S. Pat. No. 8,726,186 ("the '186 patent") to Grosz et al., issued May 13, 2014, discloses a method for displaying content within an online collage-based editor using a relative coordinate system. The method comprises establishing a "0 point" at the absolute center of a GUI page in a multi-page project, scaling, from the 0 point and in equal divisions, positive and negative heights and widths up to positive and negative limits, calculating aspect ratio groupings for objects on each page of the project, calculating a core aspect ratio for each of the plurality of aspect ratio groupings, identifying a core aspect ratio for the entire project, and then automatically resizing objects added to the project page based on the core aspect ratio. Therefore, the '186 patent teaches automatically resizing objects (for example photos, text boxes, stickers and shapes) added by a user to a page of a multi-page project in an online-collage based editor based on a predetermined aspect ratio for the project. However, the method of the '186 patent does not provide for an ability to automatically modify parameter elements on a GUI display for a machine based on parameter information, arrangement rules, and the display screen resolution.

U.S. Pat. No. 5,796,401 ("the '401 patent") to Winer, issued Aug. 18, 1998, is directed to a layout system for drawing objects and organizing drawn objects for a display screen for a personal computer. The system generally discloses a program for designing a GUI, where within the program objects may be created and manipulated to be arranged permanently in various relationships, including distributing, aligning, sizing, or spacing components of the objects. Using the program, a user may interconnect objects so that the objects automatically re-size when the page size or display screen size or resolution changes. Similarly, the system of the '401 patent does not provide for an ability to automatically modify parameter elements on a GUI for a machine based on parameter information, arrangement rules, and the display screen resolution.

U.S. Pat. No. 8,402,381 ("the '381 patent") to Berg et al., issued Mar. 19, 2013, discloses a system for automatically arranging widgets of a model within a canvas using iterative region-based widget relative adjustments. The system generally discloses automatically adjusting the layout of widgets in response to adding or adjusting the location of another widget. Similarly, the system of the '381 patent does not provide for an ability to automatically modify parameter elements on a GUI for a machine based on parameter information, arrangement rules, and the display screen resolution.

The systems and methods of the present disclosure may solve one or more of the problems set forth above and/or other problems in the art. The scope of the current disclosure, however, is defined by the attached claims, and not by the ability to solve any specific problem.

SUMMARY OF THE DISCLOSURE

According to certain aspects of the disclosure, systems and methods are disclosed for generating an improved GUI for one or more displays screen connected to one or more machines. Utilizing the systems and methods disclosed herein below, a GUI for a display may be implemented with a relative coordinate system to scale the size and location of parameter elements on one or more display screens based on parameter information received from one or more machines, arrangement rules, and the size and resolution of the one or more display screens. In some embodiments, the parameter elements may be scaled according to one or more of a proportion of the pixel count on the display screen, according to default display screen resolution, or missing data associated with parameter information for a machine. This results in a an improved GUI software that can be uniformly applied to multiple different devices across multiple different applications, minimizing the risk of user confusion and error associated with missing parameter information and non-uniform display screen resolutions, and reducing the computing resources and operational costs necessary for hardcoding coordinates for each display and machine application.

In one aspect, a computer-implemented method for generating a display with a data bus for a machine is disclosed. The method may include: receiving, by one or more processors, operations data from the data bus for the machine; extracting, by one or more processors, parameter information from the operations data; generating, by one or more processors, a graphical user interface (GUI) based on the parameter information by: determining a predetermined default display screen resolution associated with the display; determining arrangement rules associated with displaying a plurality of parameter elements, the plurality of parameter elements being determined at least in part based on the parameter information; arranging each of the plurality of parameter elements relative to a coordinate system according to the arrangement rules; scaling each of the parameter elements based on the predetermined default display screen resolution; and displaying the GUI on the display.

In another aspect, a system for generating a display associated with a data bus for a machine is disclosed. The system may include: at least one data storage device storing processor-readable instructions stored therein; and at least one processor configured to execute the instructions stored in the data storage device to perform operations comprising: receiving operations data from the data bus for the machine; extracting parameter information from the operations data; generating a graphical user interface (GUI) based on the parameter information by: determining a predetermined default display screen resolution associated with the display; determining arrangement rules associated with displaying a plurality of parameter elements, the plurality of parameter elements being determined at least in part based on the parameter information; arranging each of the plurality of parameter elements relative to a coordinate system according to the arrangement rules; scaling each of the parameter elements based on the predetermined default display screen resolution; and displaying the GUI on the display.

In yet another aspect, a non-transitory computer-readable medium containing instructions for generating a display associated with a data bus for a machine is disclosed. The non-transitory computer-readable medium may store instructions to execute operations comprising: receiving, by a processor, operations data from the data bus for the machine; extracting, by the processor, parameter information from the operations data; generating, by the processor, a graphical user interface (GUI) based on the parameter information by: determining a predetermined default display screen resolution associated with the display; determining arrangement rules associated with displaying a plurality of parameter elements, the plurality of parameter elements being determined at least in part based on the parameter information; arranging each of the plurality of parameter elements relative to a coordinate system according to the arrangement rules; scaling each of the parameter elements based on the predetermined default display screen resolution; and displaying the GUI on the display.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises, has, or includes a list of elements does not include only those elements, but may include other elements not expressly listed or inherent to such a process, method, article, or apparatus. The term "widget" is used interchangeably with "parameter element" throughout this disclosure.

In this disclosure, relative terms, such as, for example, "about," substantially," "generally," and "approximately" are used to indicate a possible variation of ±10% in the stated value. The term "exemplary" is used in the sense of "example" rather than "ideal." As used herein, the singular forms "a," "an," and "the" include plural reference unless the context dictates otherwise.

Figure 1:
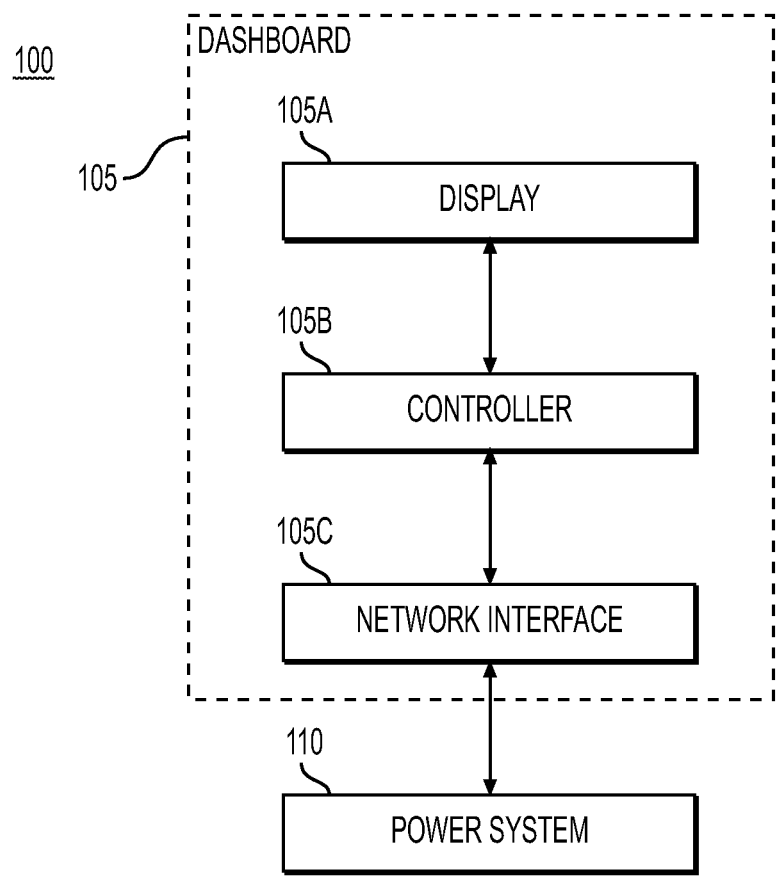
FIG. 1 depicts an exemplary block diagram of a system for a display screen with a relative coordinate system, according to one or more embodiments.

FIG. 1 depicts an exemplary block diagram of a system 100 for a display screen, according to one or more embodiments discussed herein. The system 100 may include a dashboard 105 and a power system 110. The dashboard 105 may include at least one display 105A, a controller 105B, and a network interface 105C. The controller 105B may be integrated with, or separate from (but connected to or otherwise in communication with), the display 105A, the network interface 105C, the power system 110, or combinations thereof. The display 105A may include any device capable of visual or tactile presentation of data and images in a form intelligible to a user. In some embodiments, the display 105A may present information dynamically in a visual medium. In some other embodiments, the display 105A may support a tactile display (display that may be felt by the fingers—and intended for the visually impaired) of data and images. In some embodiments, the display 105 supporting a tactile display may further be audio-enabled, such that parameter elements are associated with one or more sounds (e.g. musical tones, filtered noises, recorded sound effects, synthesized speech, and the like), in order to further assist a visually impaired user utilizing the display. Non-limiting examples of the display 105A may include a cathode ray tube, a liquid crystal display, a light emitting display, a plasma display, etc. In some embodiments, the display 105A may also accept input. In these embodiments, the display 105A may include a touch screen where information may be entered by selecting one of multiple options presented on the display. Selecting an option may be accomplished using a mouse (as is well known in the art), or touching an area of the display. In some embodiments, display 105A may comprise two or more displays in communication with controller 105B.

The display 105A may be provided with a GUI, for example, a GUI as shown in FIGS. 5-10, by a controller 105B. The controller 105B may include at least one memory device storing instructions to perform various control functions and processes; at least one processor executing the instructions from memory device to perform a set of desired operations; and a communication interface facilitating the communication between various system components. The instructions may be non-transitory computer-readable instructions for executing a control application. The communication interface of the controller 105B may enable the controller 105B to communicate with the display 105A and the network interface 105C. Accordingly, controller 105B may be configured to generate and return a GUI on display 105A according to, for example, the processes associated with FIGS. 2-4. Controller 105B may also include a wide variety of components or subsystems such as, processors, cache memory, memory controller, graphics controllers, network adapters, data processing devices, etc. In addition to performing logic, mathematical and other operations on data, the controller 105B may be configured to communicate or transfer data to and from the display 105A, the network interface 105C, the power system 110, and so forth. Although embodiments herein may be discussed as being performed by controller 105B, various steps may be performed partially or entirely by other components, controllers, processors, devices, servers etc.

Network interface 105C may be communicably connected to one or more machines directly, or via a network, such as 3G/4G/5G wireless networks, a local area network (LAN), a wide area network (WAN), a private data network, a virtual private network (VPN), and/or a public data network, such as the Internet. Network interface 105C may include any appropriate type of network device capable of communicating with other computer systems based on one or more wired or wireless communication protocols. The network interface 105C may be configured to send data to and receive data from a machine, such as parameter information, and further may be configured to send data to and receive data from the controller 105B.

Power system 110 may be an on or off-grid electrical power distribution system that may provide power to the dashboard 105 including display 105A, controller 105B, and network interface 105C as discussed above. Generally, the power system 110 may provide alternating current (AC) power and/or direct current (DC) power at a particular voltage and particular current. The power system 110 may include an interface, a controller, a generator, an energy store, or other components necessary for providing power to dashboard 105.

Therefore, the systems and methods of the present disclosure may present a GUI on a display 105A to a user based on parameter information, arrangement rules, and/or screen resolution according to the embodiments described below.

Figure 2:
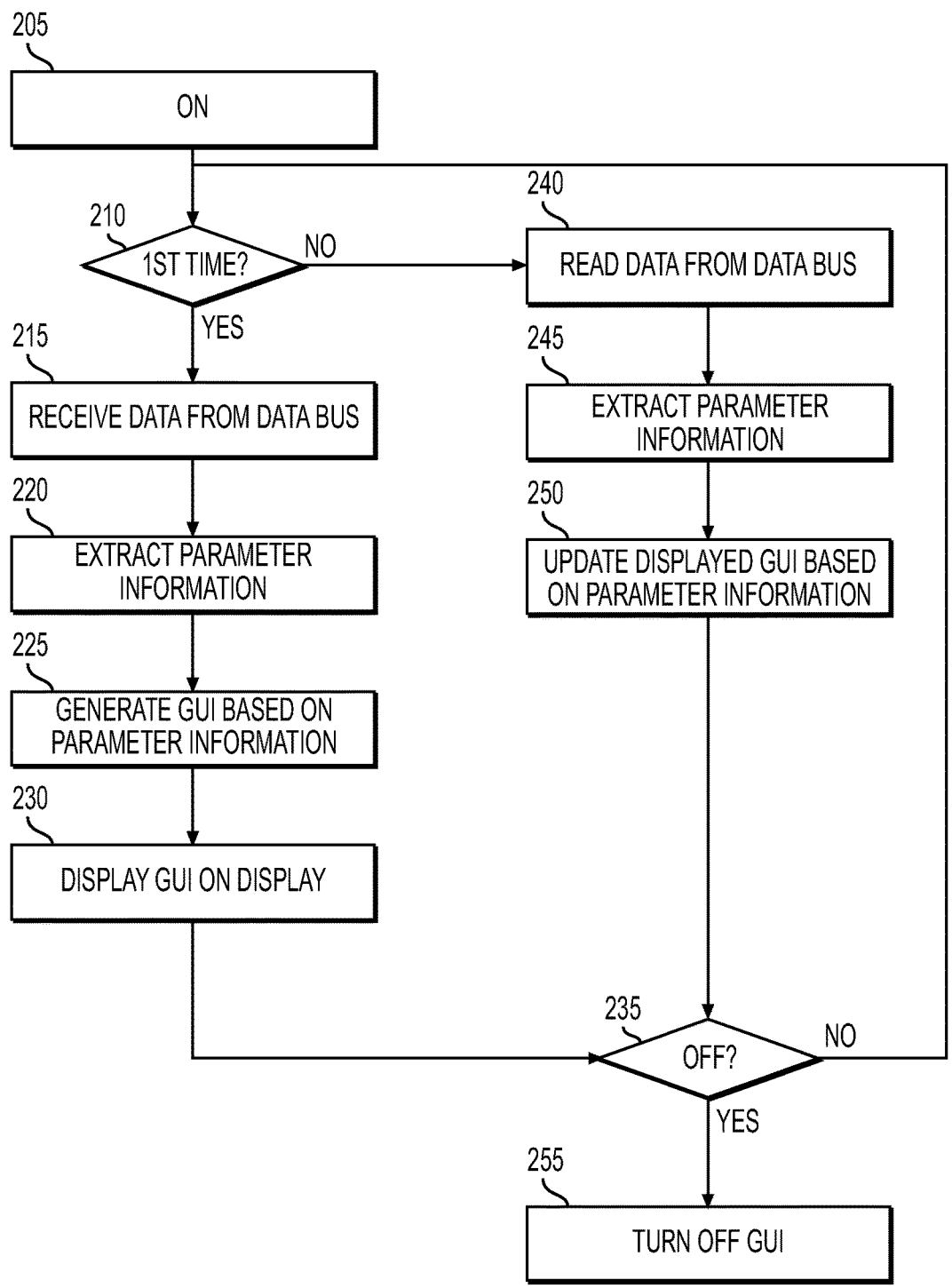
FIG. 2 depicts a flowchart for generating and updating a display based on extracted parameter information, according to one or more embodiments.

FIG. 2 depicts a flowchart of a method 200 for generating and updating a display based on extracted parameter information, according to one or more embodiments. The method 200 may be performed by the controller 105B executing the control application, as discussed above.

When the GUI system is activated, controller 105B may execute operations in blocks 205 through 255. The method may start at step 205. To start the GUI generation process, the processor may first determine, at block 210, whether this is the first iteration of the process of method 200. If the controller 105B determines that this is the first iteration of the process of method 200 (block 210: Yes), the controller 105B in response may receive data from a data bus at block 215. For example, the controller 105B may receive data from network interface 105C related to one or more machines in communication with the dashboard 105, as discussed above in relation to FIG. 1.

The controller 105B at block 220 may then extract parameter information from the received data. Parameter information may include information indicating a value of a parameter of a component of a machine, such as air temperature, pressure differential, throttle position percentage, engine load, battery voltage, frequency, and so forth. The controller 105B may then, at step 225, generate a GUI based on the parameter information. At step 230 the GUI may be provided to display 105A to be displayed to a user or operator of the system. At step 235, the controller 105B may determine whether the system has been deactivated. If the system has been deactivated (block 235: Yes), at step 255 the controller 105B may turn off the system and end the process. If the system 100 has not been deactivated (block 235: No), the controller 105B may proceed back to step 210. The processor at step 210 may then determine that it is not the first iteration of the process of method 200 (block 210: No), and in response may proceed to step 240. At step 240, controller 105B may read data from the data bus, extract parameter information at step 245 similar to extracting parameter information at 220, and then update the displayed GUI at step 250 based on the parameter information read at the data bus in step 240. The parameter information read at step 240 may be additional information provided from one or more machines.

Figure 3:
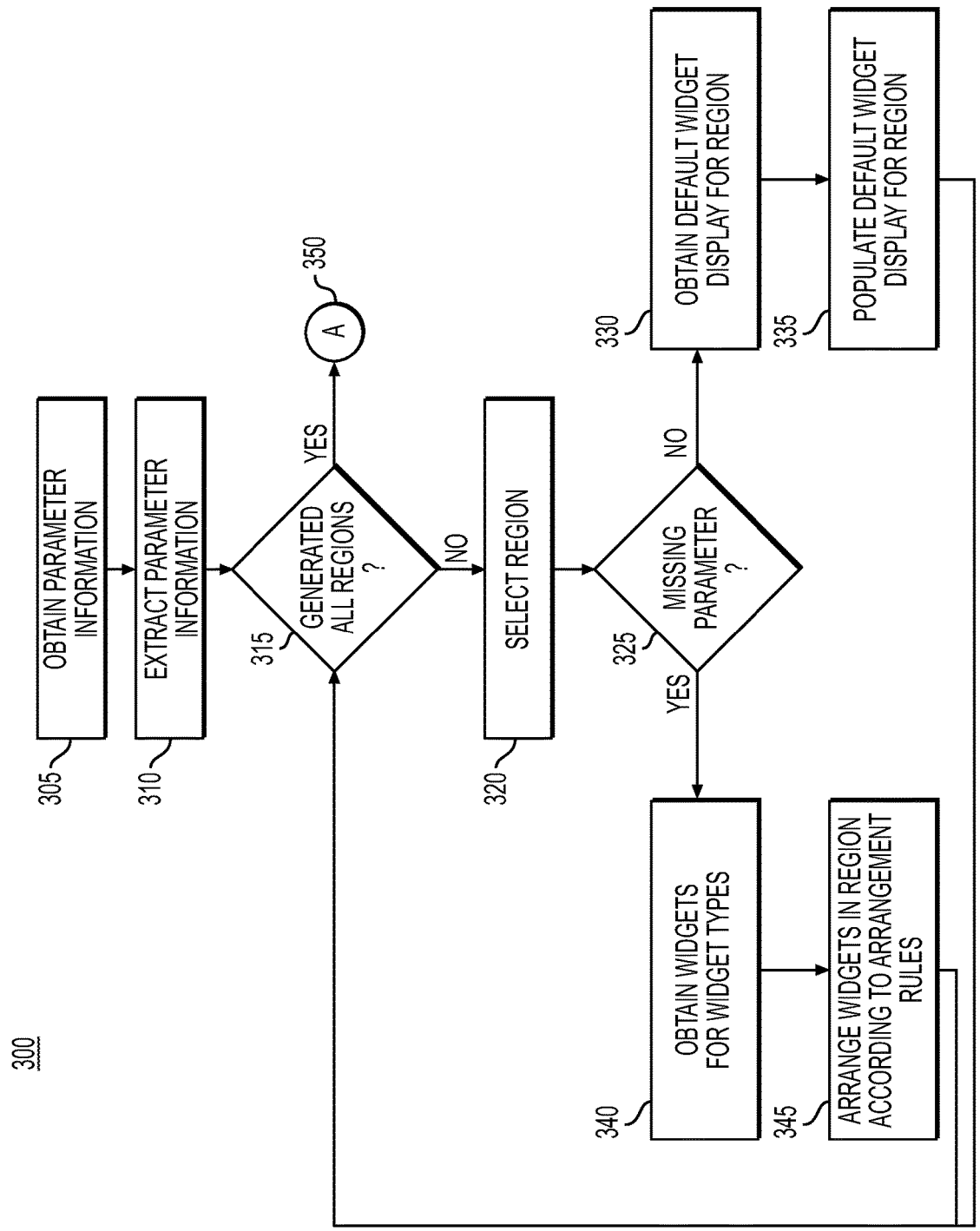
FIG. 3 depicts a flowchart for generating regions of a GUI based on arrangement rules and parameter information, according to one or more embodiments.

FIG. 3 depicts a method 300 for generating and updating a display based on extracted parameter information and arrangement rules, according to one or more embodiments. The GUI may comprise one or more regions implemented on the display 105A by controller 105B. Each of the one or more regions may contain one or more parameter elements and/or widgets for display in said region, as will be discussed further below with respect to FIGS. 5-10. The term "widget" is used interchangeably with "parameter element" throughout this disclosure.

For instance, the controller 105B may begin method 300 at block 305. The controller 105B may obtain data (for example, parameter information) at step 305 and extract parameter information from the obtained data at step 310. For example, the controller 105B may receive data from machinery via a network interface as discussed above in relation to FIG. 1. At step 315 the controller 105B may determine if all the one or more regions of the GUI have been generated. If no (block 315: No), the processor may select one of the one or more GUI regions at step 320, and then determine at step 325 whether the selected GUI region is missing a parameter. If no parameter is missing (block 325: No), at step 330 the controller 105B may obtain predetermined default parameter elements (e.g. widgets) and populate the default widget display for the GUI region. The process may then proceed back to step 315, where the controller 105B may again determine whether the widgets/parameter elements for all regions have been generated.

At step 315, the processor may determine that not all of the regions have been generated (block 315: No) and proceed to selecting a region at step 320. In this example, the controller 105B may then determine that there is a missing parameter at step 325 (block 325: Yes). A missing parameter may be a parameter that is not provided by the machine to the dashboard 105, for example, a parameter that is not present in the current application. For example, a particular machine may communicate parameter information to dashboard 105 that does not include parameter information concerning throttle position percentage or a fuel filter differential pressure. In response to determining that a parameter is missing in a selected region (block 325: Yes) the controller may then obtain the widgets corresponding to present (non-missing) parameters and then arrange the widgets according to specific arrangement rules in step 345. For example, a coordinate system may be implemented such that widgets are ordered relative to a reference point in order to avoid or minimize gaps or blank regions in the GUI, as discussed further below with respect to FIGS. 5-10. Once the widgets have been arranged according to the arrangement rules, the controller 105B may proceed to step 315.

The above process repeats until all of the one or more regions have been generated (block 315: Yes). In response, the controller may then proceed to Point A (block 350). The controller 105B may then start the process of method 400 at point A (350/405) in FIG. 4.

Figure 4:
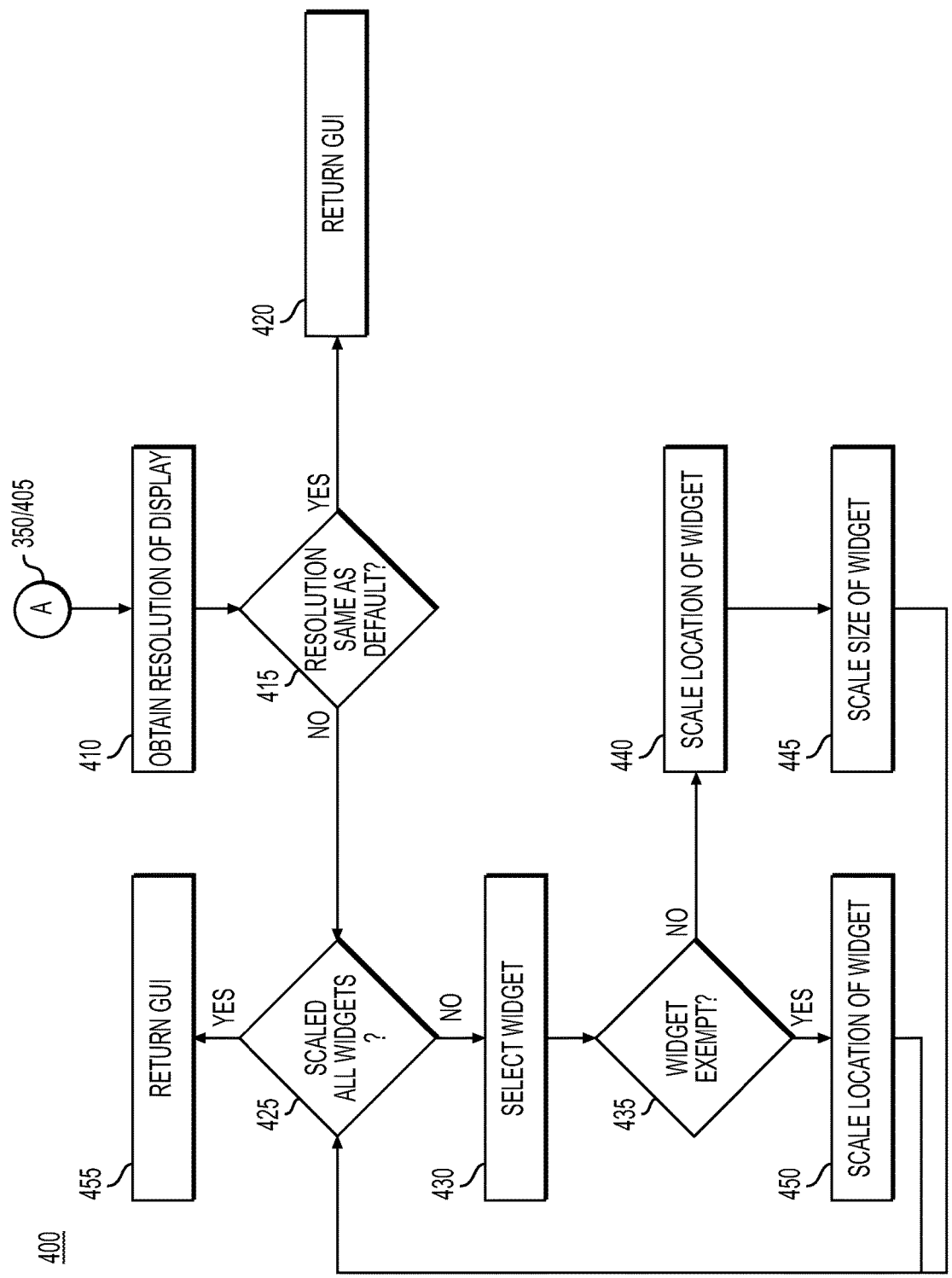
FIG. 4 depicts a flowchart for scaling the size and location of one or more parameter elements on a GUI based on screen resolution, according to one or more embodiments.

FIG. 4 depicts a method 400 for generating and updating a display based on extracted parameter information, arrangement rules, and/or screen resolution, according to one or more embodiments. Once all widgets for all regions have been generated and arranged as explained above in connection with FIG. 3, the controller 105B may then obtain a screen resolution of the display 105A at step 410. The screen resolution may be calculated any number of ways. In one embodiment, the screen resolution is the number of pixels that are displayed on screen 105A. At step 415, the controller 105B may compare the obtained screen resolution to a predetermined default screen resolution. The predetermined default screen resolution may be any screen resolution. In some embodiments, the predetermined default screen resolution is the resolution of the majority of the screens used for that particular application. In other embodiments, the predetermined default screen may be the resolution of the screen that is used for a majority of time for that particular machine application. If the controller 105B determines that the resolution of the display 105A is identical to the predetermined default screen resolution (i.e. there is on difference in resolution) (block 415: Yes), then the controller 105B may return the GUI at step 420 on the display.

If at step 415 the controller 105B determines that the display 105A resolution is not the same as the predetermined default screen resolution (block 415: No), then the controller 105B may proceed to step 425. At step 425, the controller 105B may determine whether all the parameter elements have been scaled to a desired size and/or location. If one or more parameter elements have not been scaled (block 425: No), the controller 105B may select one of the one or more parameter elements that have not been scaled at step 430. Size rescaling may refer to modifying the dimensions of the parameter element itself. Location rescaling may refer to modifying the location of the parameter element on the screen relative to a reference point on the screen. At step 435, the controller 105B may determine whether the parameter element is exempt from size rescaling.

In some embodiments, scaling the size of a parameter element might not be appropriate, for example, when for a particular machine application it is preferred that a particular parameter element remain the same size independent of screen resolution. For example, a widget that is a fingerprint scanning input should remain roughly the size of a human finger, and should not be scaled larger or smaller. Accordingly, certain parameter elements may require location scaling but may be exempted from size scaling. If the controller 105B determines that the selected parameter element is exempt from size scaling (block 435: Yes), the controller 105B may scale the location of the parameter element, and may proceed back to step 425 to repeat the process.

Controller 105B at step 425 may determine again that one of the one or more parameter elements at step 425 is not scaled (block 425: No), and then may select another one of the one or more parameter elements that have not been scaled at step 430. At step 435, in response to determining that the selected one of the one or more parameters selected at step 430 is not exempt from size scaling (block 435: No), the controller 105B may then scale the location of the parameter element at block 440. After scaling the location of the parameter element at step 440, the controller 105B may scale the size of the parameter element as well at step 445. Once the size and location of the selected parameter element has been scaled, the method may return to step 425.

In response to determining that all of the parameter elements have been scaled (block 425: Yes), the controller 105B may return a GUI on the display 105A at step 160. Accordingly, as the controller 105B receives updated parameter information, the controller 105B may repeat the process described and provide real-time updates to the GUI. It should be appreciated that the disclosed methods in FIGS. 2-4 transform a graphical user interface of a display in a manner that cannot be performed manually, and instead necessarily require a computer processor to extract parameter information received from a data bus for a machine, generate and scale parameter elements based in part on the parameter information received from the data bus, display screen resolution, and arrangement rules, and display the resulting GUI on a display screen.

Figure 5A:
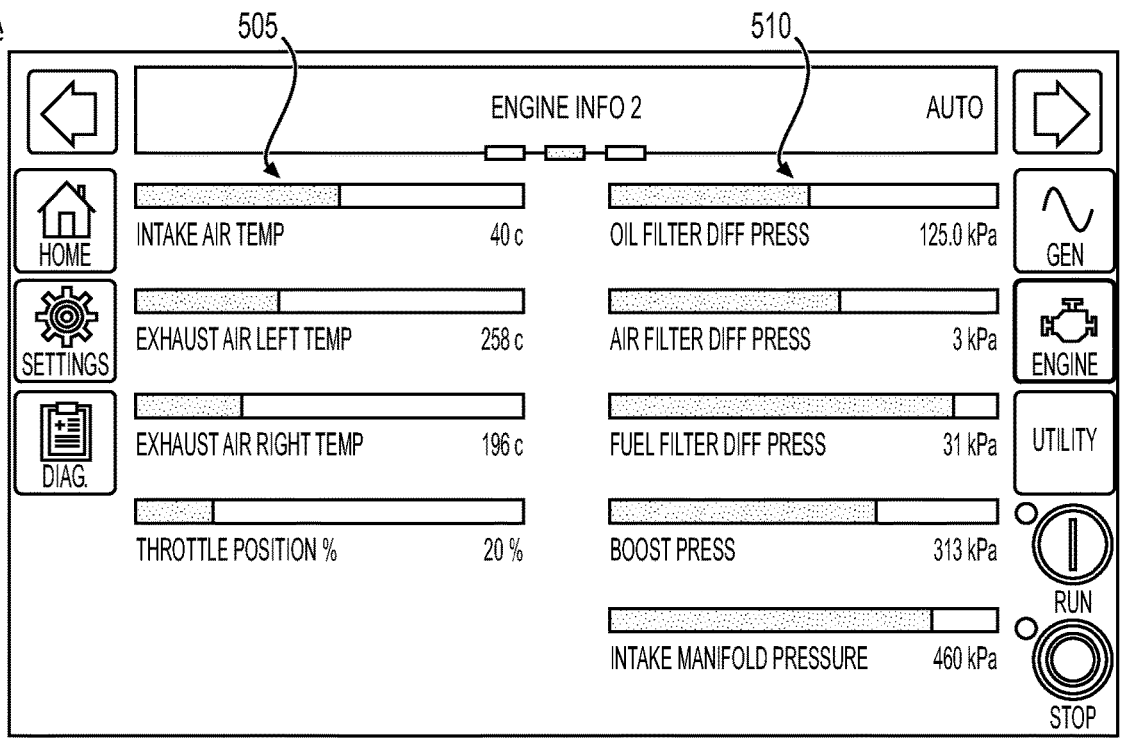
FIGS. 5A-5C depict GUIs displayed to a user on display screens connected to one or more machines, prior to arranging parameter elements according to arrangement rules according one or more embodiments.
Figure 5B:
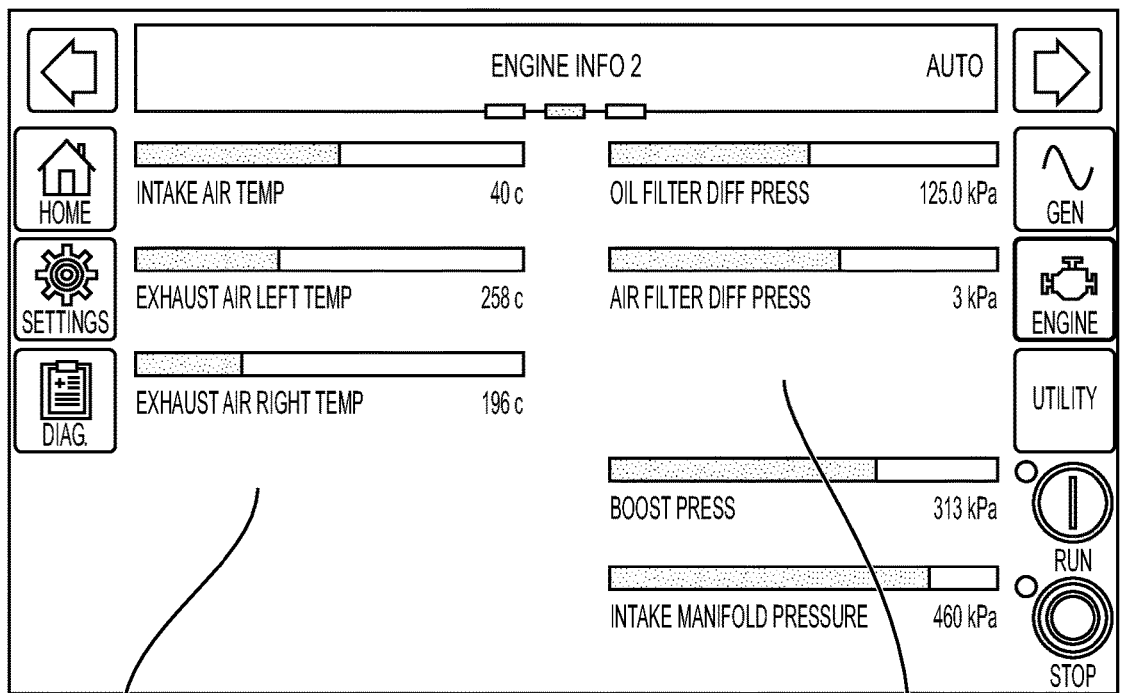
Figure 5C:
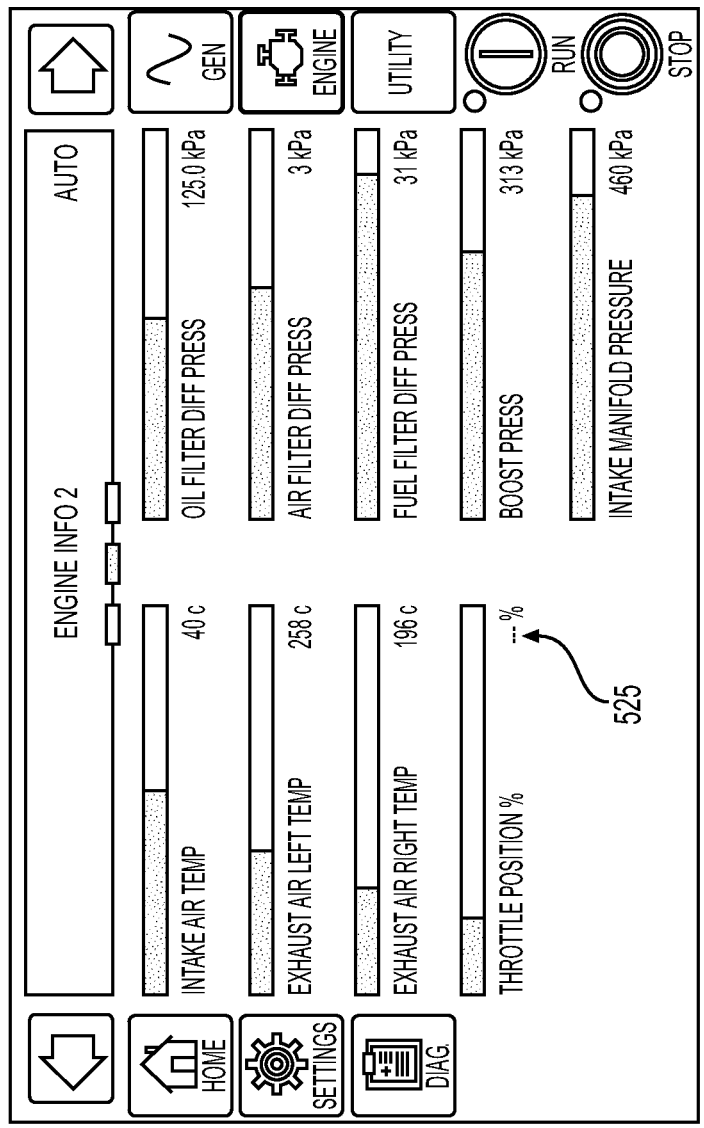

FIGS. 5A-C depict example GUIs displayed to a user on display screens, prior to arranging widgets according to arrangement rules according to techniques discussed herein. GUI 500A, depicted in FIG. 5A, may be generated by a controller 105B and implemented on a display 105A as described above with respect to FIGS. 1-4. GUI 500A may comprise two regions, a first region 505 and a second region 510, as described above with respect to FIG. 3. First region 505 comprises a column of parameter elements (e.g. widgets), for example, Intake Air Temperature, Exhaust Air Left Temperature, Exhaust Air Right Temperature, and Throttle Position %. Each parameter element corresponds to parameter information received by the controller 105B from one or more connected machines.

In some embodiments, the machines includes sensors for measuring parameters, and the information received from these sensors may be transmitted to dashboard 105 and controller 105B for display via a GUI on display 105A. In this manner, a GUI may be used to monitor parameters of one or more machines so that an operator can confirm that machinery is operating efficiently and safely. Second region 510 may comprise a column of additional parameter elements such as, in this example, Oil Filter Differential pressure, Air Filter Differential Pressure, Fuel Filter Differential Pressure, Boost Pressure, and Intake Manifold Pressure. As with region 505, these parameter elements may correspond to parameter information received by the controller 105B from one or more machines.

FIG. 5B depicts the GUI 500B with the parameter elements displayed from GUI 500A except for parameter element 515A (Throttle Position %) and parameter element 515B (Fuel Filter Differential Pressure). Parameter elements 515A and 515B may correspond to "missing parameters" as described above with respect to FIG. 3, process 300, at step 325.

FIG. 5C depicts the GUI 500C with the parameter elements from FIG. 5A, but provides a null value (for example, "---" or an "N/A") for parameter elements where no parameter information is provided, instead of replacing the parameter elements with a blank space entirely as depicted in GUI 500B in FIG. 5B.

In some embodiments, GUI 500A, 500B, and 500C may be implemented on separate display devices, but receive data from the same machine application. In this example, a first user monitoring a machine on a first device may use GUI 500A to monitor all of the parameter elements of the machine as shown in FIG. 5A. A second user monitoring the same machine on a second device using GUI 500B may not need (or may not be authorized) to view all of the parameter information, and accordingly, may only have access to the parameter elements shown in FIG. 5B and GUI 500B. In other words, the second user viewing GUI 500B on the second device would not see parameter elements 515A and 515B (e.g. depicted as blank spaces) corresponding to where Throttle Position % and Fuel Filter Differential Pressure are displayed on GUI 500A in FIG. 5A. In another embodiment, a third user monitoring the same machine on a third device using GUI 500C may still view all the parameter elements depicted in FIG. 500A, but for the missing parameter information GUI 500C may instead provide a null value 525 for the Throttle Position % parameter element. It is appreciated that in either case of GUI 500B or GUI 500C, the resulting display creates the appearance of malfunctioning software or machinery, which may result in user confusion or error.

In other embodiments, GUI 500A, 500B, and 500C may be GUIs implemented on the same display, separately or simultaneously, but applied to different machine applications with different parameter information. For example, in some embodiments, GUI 500A may be a first window on the display 105A for a first machine, GUI 500B may be a second window on the same display 105A for a second machine, and GUI 500C may be a third window on the display 105A for a third machine. The first machine may provide parameter information related to Throttle Position % and Fuel Filter Differential Pressure, and GUI 500A would accordingly depict parameter element based on that parameter information. The second machine might not provide parameter information related to Throttle Position % and Fuel Filter Differential Pressure, and accordingly, GUI 500B may display blank spaces 515A and 515B where the parameter elements for Throttle Position % and Fuel Filter Differential Pressure. The third machine might not provide parameter information related to Throttle Position %, and GUI 500C may accordingly depict a null value 525 for the Throttle Position % parameter element. In either case of GUI 500B or GUI 500C, the resulting display creates the appearance of malfunctioning software or machinery, which may result in user confusion or error.

Figure 6:
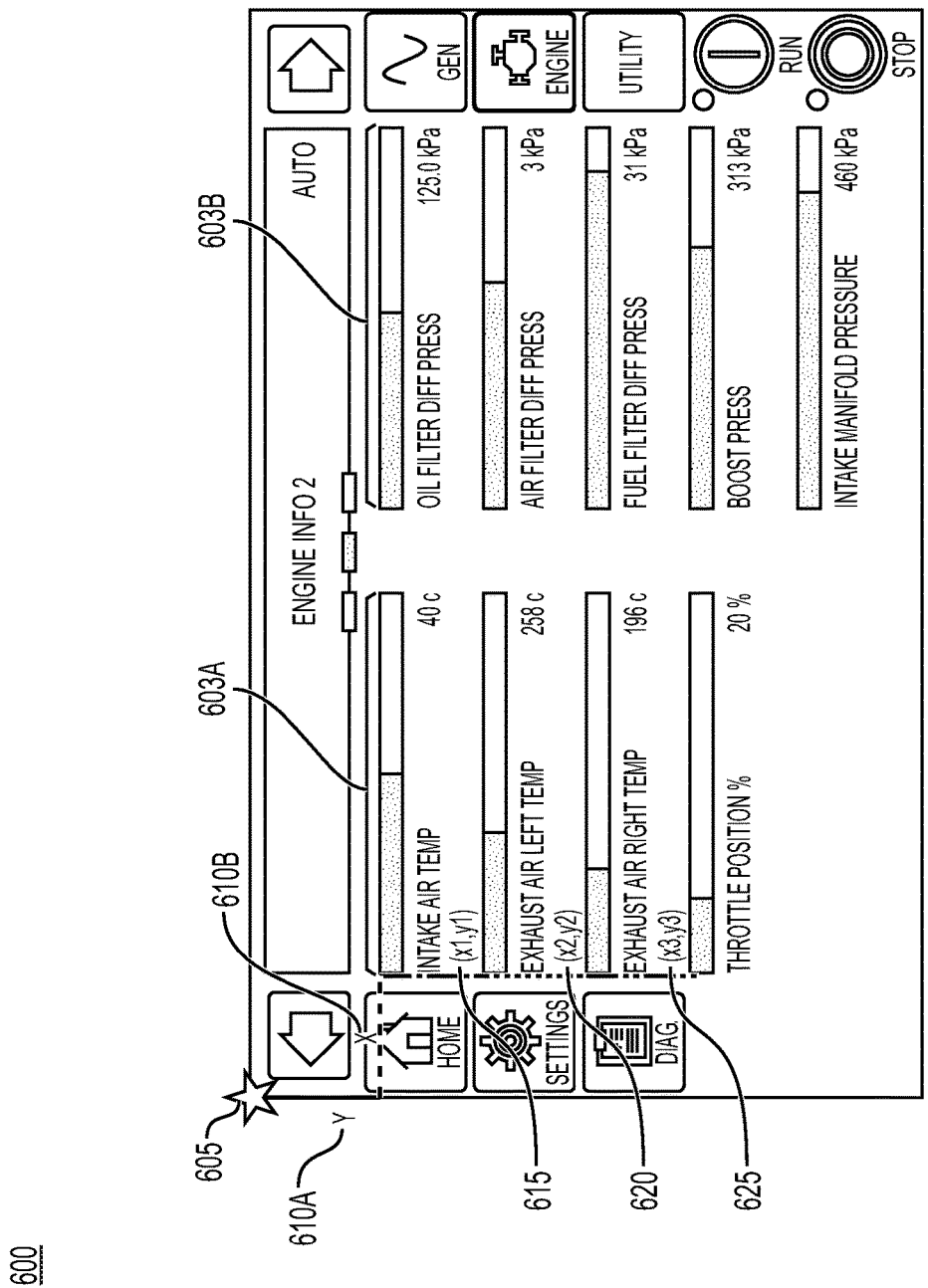
FIG. 6 depicts an exemplary GUI with the parameter elements arranged according to arrangement rules, according to one or more embodiments.

FIG. 6 depicts an exemplary GUI 600 with the parameter elements arranged according to arrangement rules and a relative coordinate system, according to one or more embodiments. GUI 600 comprises column regions 603A and 603B for displaying parameter elements. In one embodiment, GUI 600 may be implemented with a relative coordinate system. Controller 105B may determine a predefined reference point 605. The predetermined reference point 605 may be a point at the uppermost left corner of the GUI 600, as shown in FIG. 6.

While the upper leftmost corner is used in this example, the predetermined reference point may be any other point on the display screen, or may even be a point that is not on the screen, so long as the controller 105B is able to rely on the reference point to implement one or more arrangement rules.

The GUI 600 is defined by a scaled vertical axis Y 610A and a scaled horizontal axis X 610B relative to the reference point. The GUI may further be defined by pixels, wherein the number of pixels depend on the resolution of the display 105A obtained at step 410 in FIG. 4. In some embodiments, the region 603A may include an Intake Air Temperature parameter element positioned at coordinate (x1, y1) 615, an Exhaust Air Left Temperature parameter element coordinate (x2, y2) 620, and an Exhaust Air Right Temperature parameter element at coordinate (x3, y3) 625. Coordinates 615, 620, and 625 may be determined based on a function of the resolution of the display 105A obtained at step 410 in FIG. 4. In this manner, the location of one or more parameter elements on GUI 600 may automatically be adjusted according to the obtained screen resolution of display 105A at step 410 in FIG. 4. For example, each parameter element may be sized according to a predetermined portion of the determined screen resolution. For example, based on the total height of the screen in pixels, a predetermined portion of the screen on the Y axis may be designated as an area for parameter element display. The maximum number of items in need of display between columns 603A and 603B may be determined, and the Y value heights for each parameter element may be determined accordingly. The same process may be repeated to determine the X-axis dimensions. In some embodiments where the obtained resolution at step 410 in FIG. 4 is the same as a predetermined default resolution, then the controller 105B need not adjust the GUI at all, resulting in additional computing resources savings.

Figure 7:
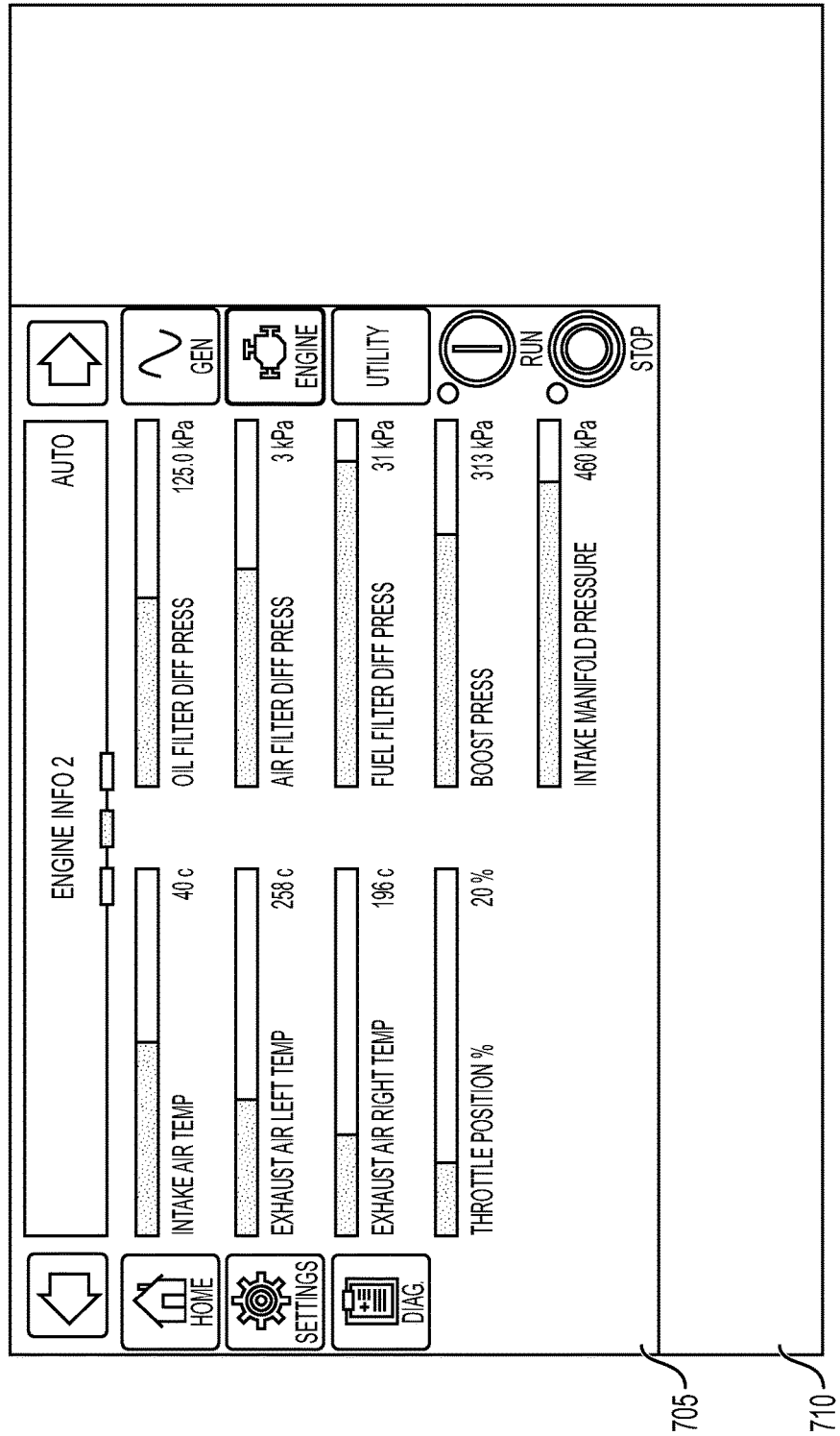
FIG. 7 depicts a GUI displayed to a user on a display screen, prior to scaling and moving parameter elements according to one or more embodiments.

FIG. 7 depicts an exemplary GUI 700 displayed to a user on a display screen, prior to scaling and moving widgets according to one or more embodiments. For example, the display 105A on which GUI 700 has been implemented may not have the same resolution as the predetermined default resolution as discussed above with respect to step 415 in FIG. 4. It can be appreciated that the GUI 700 as shown may cause user confusion or error. The boundary of the GUI 700 may be within the display screen, rather than at the edge, thus leaving unused space 710.

Figure 8:
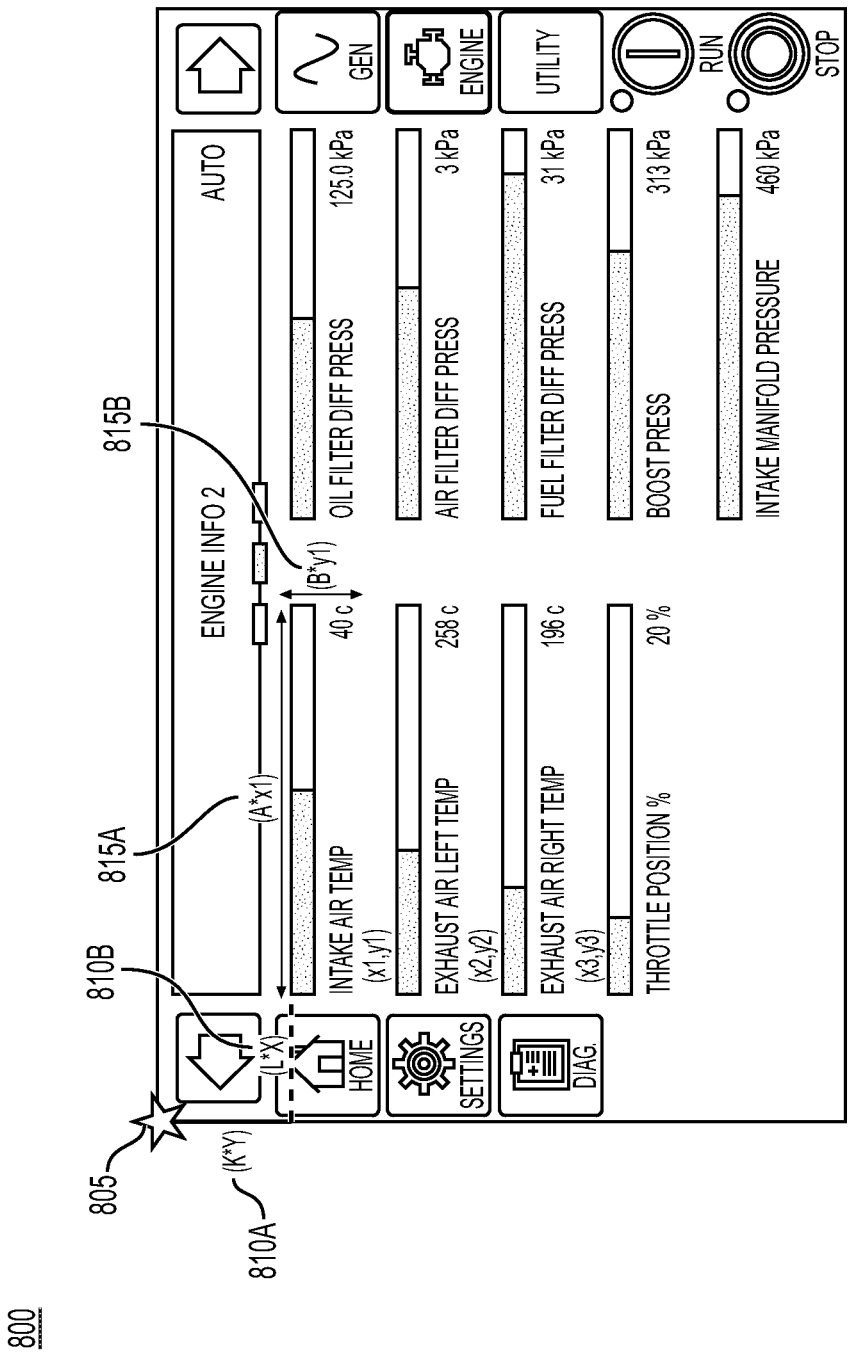
FIG. 8 depicts an exemplary GUI with parameter element location and size scaled based on a displays screen resolution, according to one or more embodiments.

FIG. 8 depicts an exemplary GUI 800 with widget locations and sizes scaled based on a display screen resolution, according to one or more embodiments. For example, if the obtained screen resolution at step 415 in FIG. 4 was determined by controller 105B to be the same as the predetermined displays screen resolution, then the GUI 800 would be the GUI returned at step 420 in FIG. 4. In other examples, the GUI 800 may be the GUI returned after all parameter elements have been scaled at step 455 in FIG. 4. GUI 800 is further annotated with a predetermined reference point 805, a location scaling factors 810A and 810B, and size scaling factors 815A and 815B. The location scaling factors 810A and 810B may be implemented by the controller 105B at step 440 and/or step 450 in FIG. 4 to scale the location of one or more parameter elements on GUI 800. The location scaling factors 810A and 810B may further be determined based in part on the obtained screen resolution at step 410 in FIG. 4. The size scaling factors 810A and 810B may be implemented by the controller 105B at step 445 in FIG. 4 to scale the location of one or more parameter elements on GUI 800. Similarly the size scaling factors 815A and 815B may also be determined based on the obtained screen resolution at step 410 in FIG. 4.

For example, with reference to FIG. 8, the location of a widget may be a variable of the origin. For example, Widget 1 (Intake Air Temperature) may be positioned according to the equation (x1, y1)=(L*X+X, K*Y+Y), where (X,Y) may be the reference point based on the predetermined reference point 805, and L and K are variables that determine the position of the widget relative to the reference point. Widget 2 (Exhaust Air Left Temp) may be positioned according to the equation (x2,y2)=(x1+X, y1+Y), where (x1,y1) may be the reference point for widget 2, instead of (X,Y) as was used for widget 1. Similarly, widget 3 (Exhaust Air Right Temp) may be positioned according to the equation (x3,y3)=(x2+x1+Y,y2+y1+Y), with (x2,y2) become the reference point. Accordingly, where the controller 105B determines that a parameter element is missing according to FIGS. 2-4, for example widget 2 (Exhaust Air Left Temp) is no longer needed or present, widget 3 (Exhaust Air Right Temp) may automatically be moved to the position occupied formerly by widget 2.

Figure 9A:
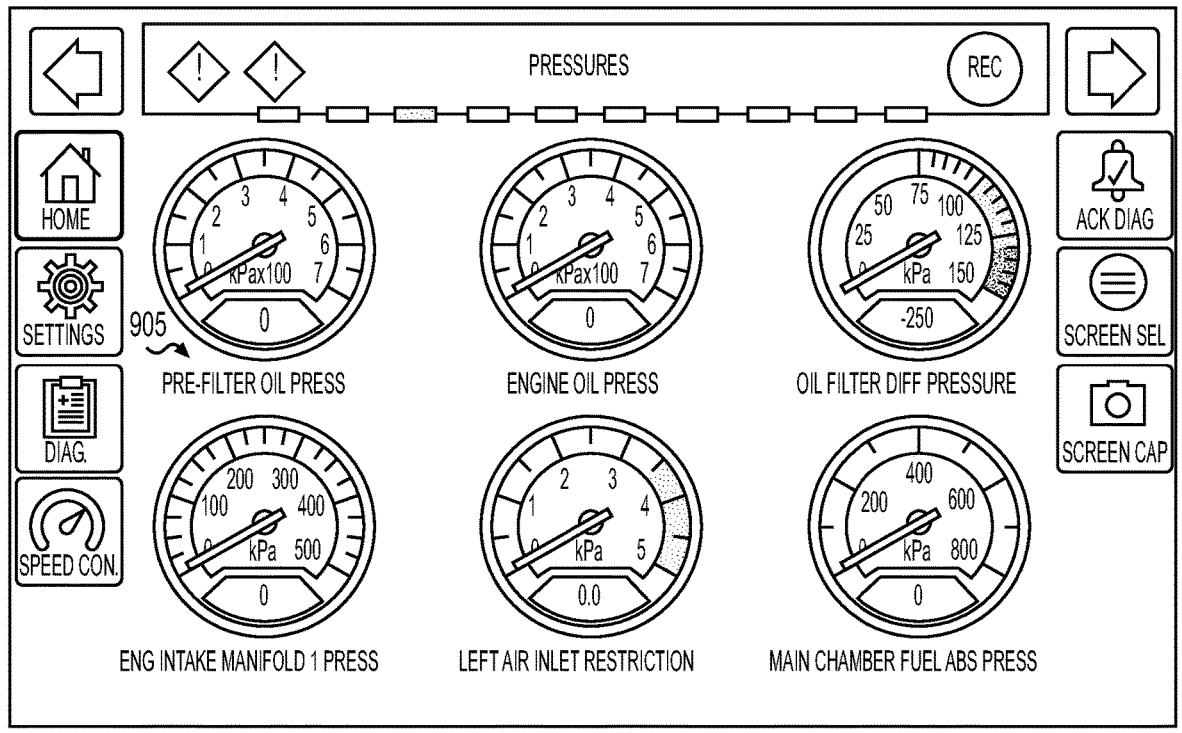
FIGS. 9A and 9B depict alternative exemplary GUIs, according to one or more embodiments.
Figure 9B:
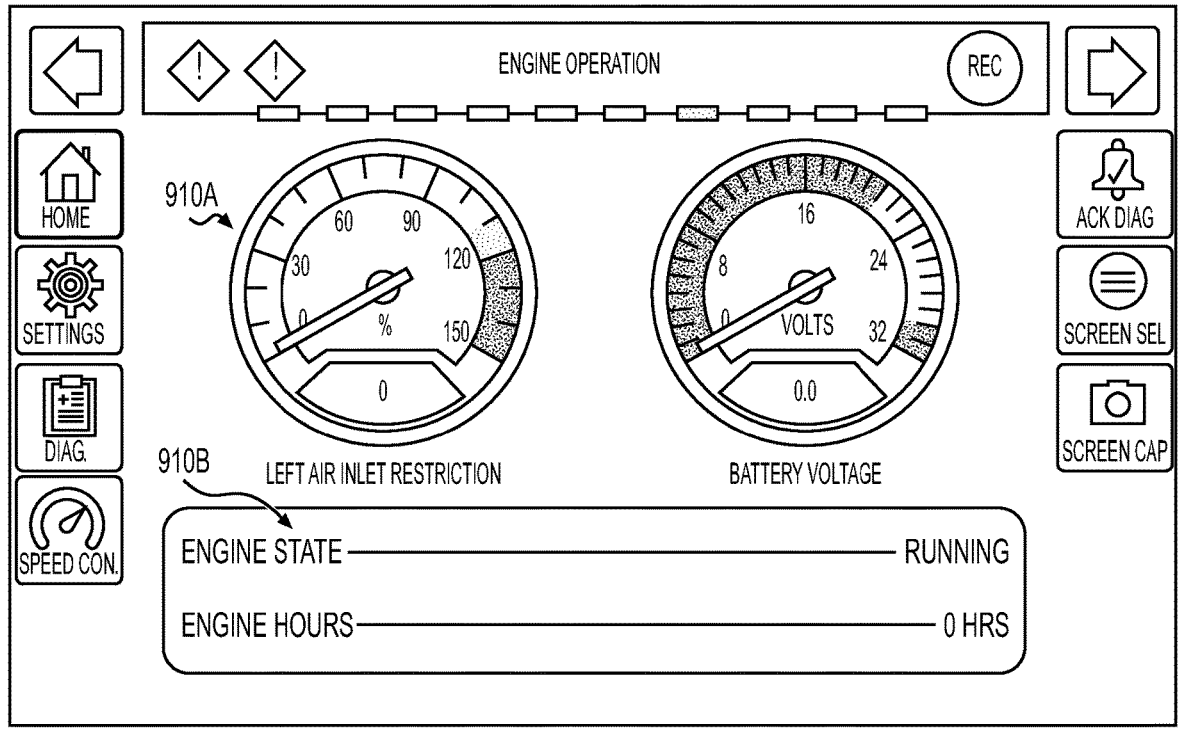

FIGS. 9A and 9B depict alternative exemplary GUIs for a machine, according to one or more embodiments. GUI 900A features parameter elements 905, which may be widgets, depicted graphically as circular gauges, and further are limited to a particular type of parameter elements, in this case, "Pressures." GUI 900B implemented for the same machine may be limited to different types of parameters elements from GUI 900A, in this case "Engine Operation." In this manner, the same GUI software can be used to show different sizes, locations, and types of parameter elements with different parameter information.

Figure 10:
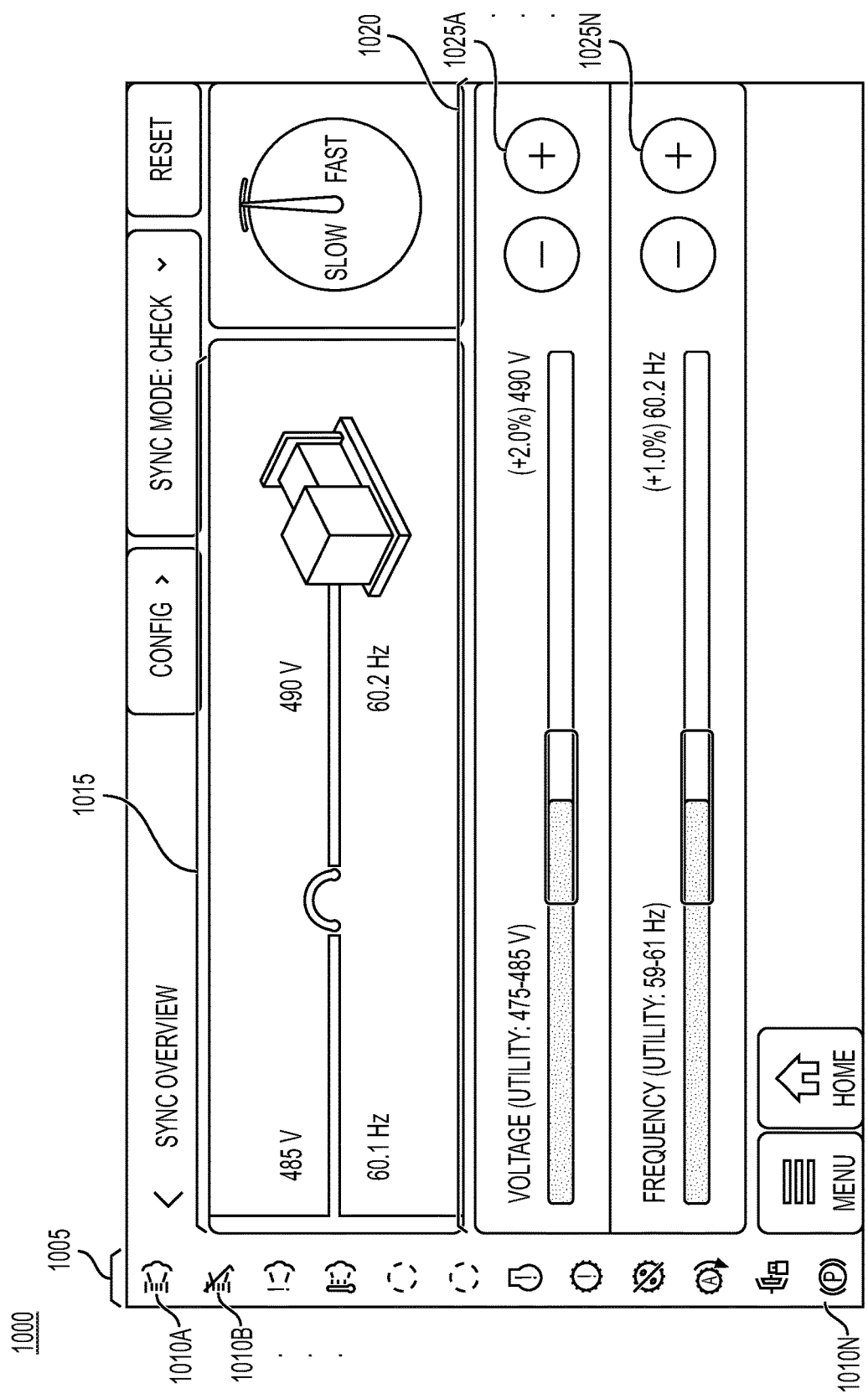
FIG. 10 depicts another exemplary GUI, according to one or more embodiments.

FIG. 10 depicts another exemplary GUI 1000, according to one or more embodiments. The GUI 1000 includes a region 1005 comprising window indicators 1010A through 1010N. Each window indicator 1010A through 1010N may be selectable by a user, and may cause a GUI to be displayed with parameter elements. The window indicators 1010A through 1010N may be configured to change shape or color, or change in position relative to other window indicators, depending on the parameter information. For example, a window indicator may change shape, color, and/or position if a parameter for a machine reaches a critical level, such that a dangerous environment is present. The GUI 1000 may further comprise parameter elements 1015, 1020, and 1025A through 1025N. In some embodiments, not all parameter elements are visible simultaneously, but may be accessed by navigating the GUI, for example, by scrolling up or down.

Figure 11:
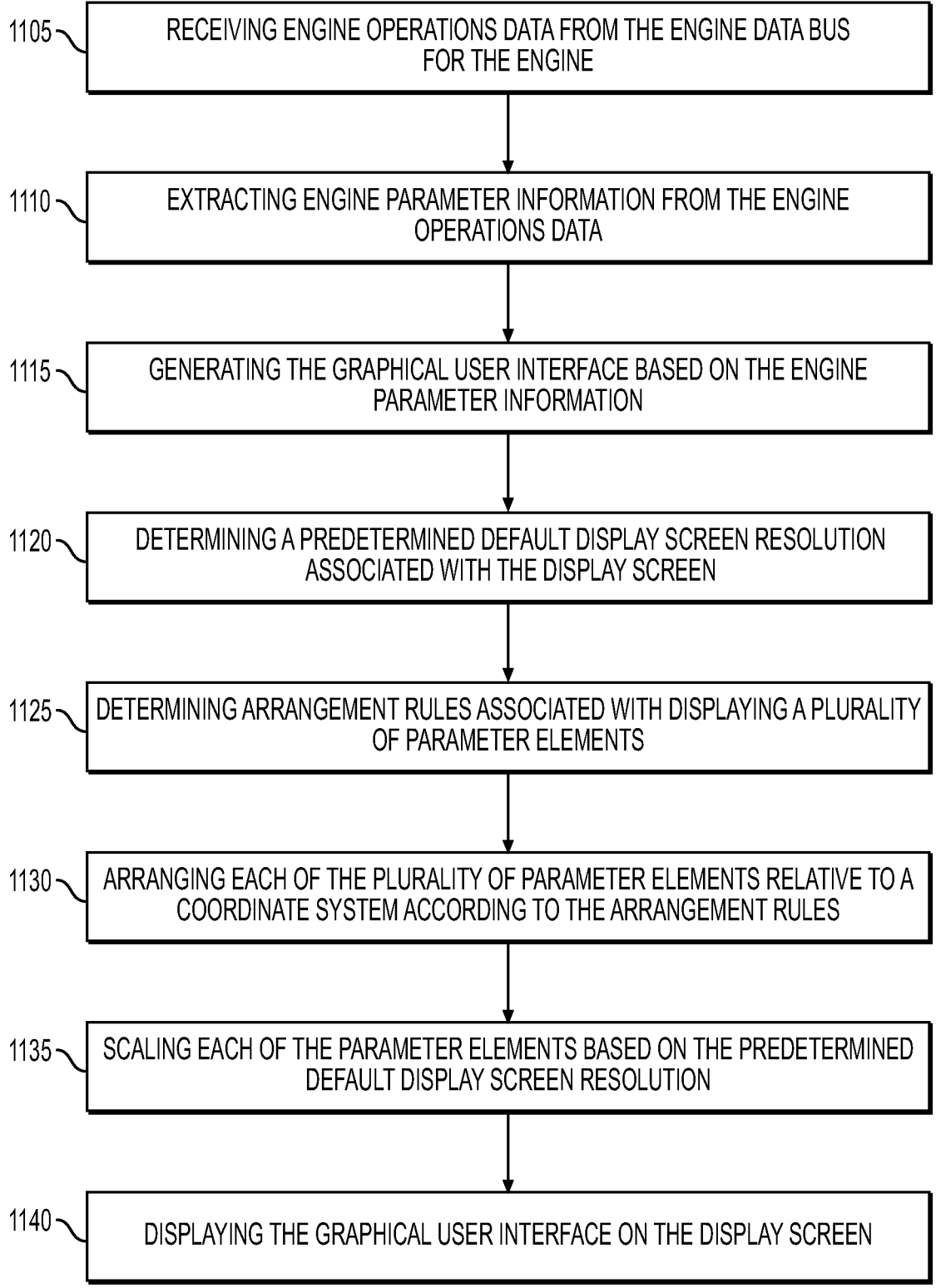
FIG. 11 depicts a flowchart of an exemplary computer device or system, in which embodiments of the present disclosure, or portions thereof, may be implemented.

FIG. 11 depicts a flowchart of a method 1100 for implementing an improved GUI having a relative coordinate system to display parameter information on a display, according to one or more embodiments. In an initial step 1105, a controller 105B may receive operations data from a data bus, for example, engine operations data from an engine data bus. The controller 105B may receive the operations data via a network interface 105C connected to machinery, for example, an engine, via a network as described above with respect to FIG. 1. At step 1110, the controller 105B may extra parameter information, for example engine parameter information, from the received operations data. Parameter information may include information obtained from sensors implemented in machinery for measuring physical or environmental factors. For example, parameter information could be information pertaining to temperature, pressure, battery voltage, run time, throttle position %, frequency, engine load, engine state, and/or any other information that is desired to be measured. Parameter information is not limited to the above factors, and may also include past and predicted future states, so that parameter information is not limited only to current measured values.

At step 1115, controller 105B may generate a GUI based on the extracted parameter information, as described above with respect to FIGS. 1-10, and by implementing steps 1120 through 1135 as discussed below. At step 1120, the controller 105B may determine a predetermined default display screen resolution associated with a display, for example, display 105A. The display screen resolution may be measured in any manner. In some embodiments, display screen resolution is measured in terms of pixels.

At step 1125, the controller 105B may determine arrangement rules associated with displaying a plurality of parameter elements, as described above with respect to FIGS. 2-4. Various arrangement rules are contemplated. For example, an arrangement rule may be determined that parameter elements must be adjacent to each other, such that gaps or blank spaces between parameter elements are minimized. In other embodiments, a determined arrangement rule may require a set specified distance between parameter elements. In further embodiments, a determined arrangement rule may require certain parameter elements to always be spatially arranged with respect to other parameter elements. In yet another embodiment, a determined arrangement rule may modify the arrangement of parameter elements based on screen resolution. In an additional embodiment, a determined arrangement rule may modify the arrangement parameter elements based on the parameter information, for example, prioritizing certain parameter elements based on the value of the parameter information—for example, if a battery voltage reaches a dangerously high level, an arrangement rule may move the parameter element for battery voltage to a location more visible to the user to alert the user of the battery voltage danger. In another embodiment, the determined arrangement rule may modify the arrangement parameter elements based on parameter information priority, for example, temperature (if available) may always be above throttle position %, or oil filter pressure may always be displayed to the right of temperatures, and so forth, to maintain consistency in parameter locations for a user.

At step 1125, after arrangement rules have been determined by controller 105B at step 1120, the controller 105B at step 1130 may proceed to arrange the plurality of parameter elements relative to a coordinate system as described above with respect to step 1125 according to the arrangement rules. At step 1135, the controller 105 may scale the location and size of each parameter element based on the predetermined default display screen resolution. In some embodiments, that controller 105B may scale the location, but not the size, of parameter elements. In other embodiments, the controller 105B may scale both the location and the size of parameter elements. The controller 105B scales the size and/or location of parameter elements as a function of the screen resolution. In this manner, in some embodiments, the controller 105B may be able to scale size and location of parameter elements for any display screen with any display screen resolution without causing user confusion or error.

Finally, at step 1140, the controller 105B implements the GUI on display screen 105A for display to the user, as described above with respect to FIGS. 1-4. The controller 105B may continuously display a GUI while also automatically updating the GUI according to the disclosed embodiments described in FIGS. 1-11. In this manner, if the display screen resolution of display 105A were changed, for example if the display resolution setting on display 105A was changed or if display 105A in dashboard 105 was replaced while the machinery was still in operation, the controller 105B could continue to operate and update the GUI to ensure continuous run-time. Further, additional display screens were implemented with controller 105B, controller 105B would be able to simultaneously update multiple screens according to the above mentioned embodiments.

Figure 12:
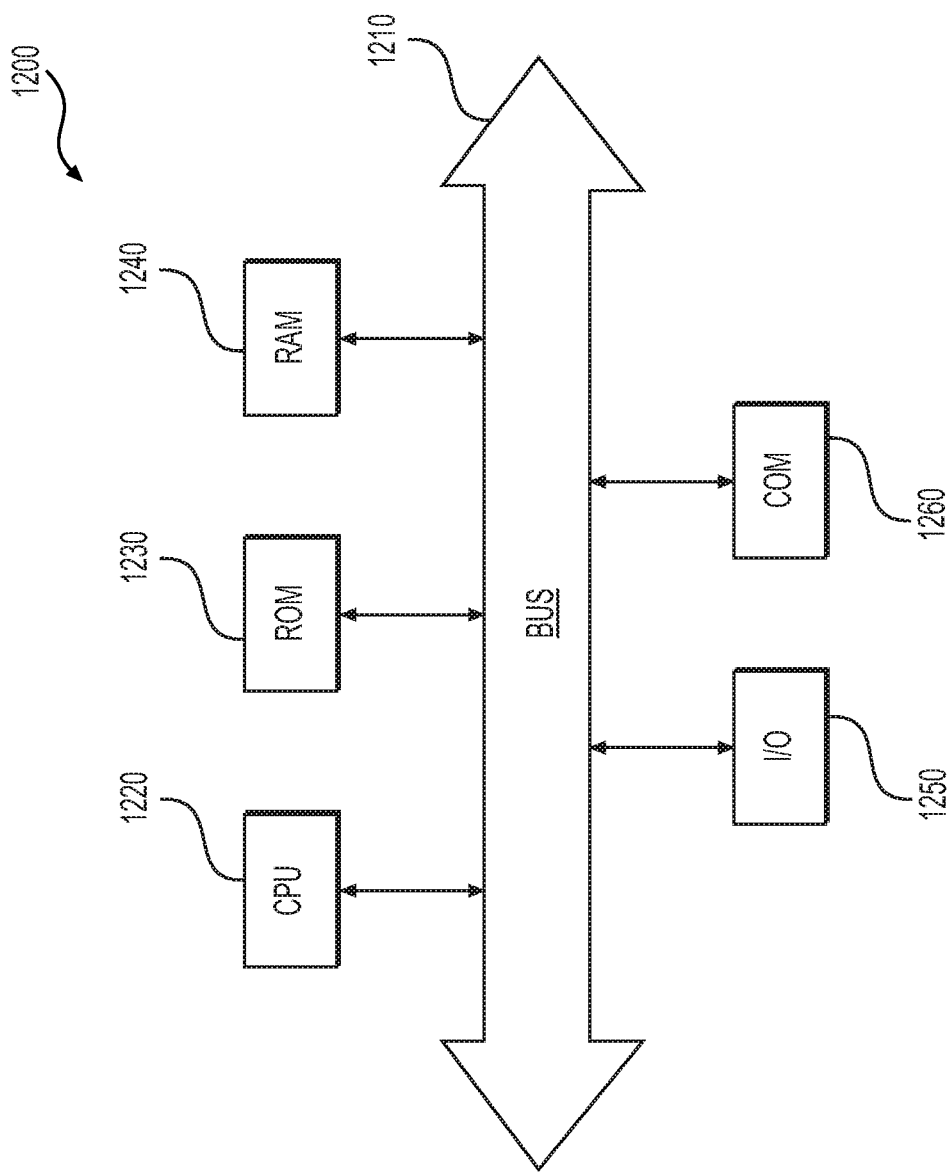
FIG. 12 depicts an example system that may execute techniques presented herein.

FIG. 12 depicts an example system that may execute techniques presented herein. FIG. 12 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1260 for packet data communication. The platform may also include a central processing unit ("CPU") 1220, in the form of one or more processors, for executing program instructions. The platform may include an internal communication bus 1210, and the platform may also include a program storage and/or a data storage for various data files to be processed and/or communicated by the platform such as ROM 1230 and RAM 1240, although the system 1200 may receive programming and data via network communications. The system 1200 also may include input and output ports 1250 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a programmed controller or computer. Those skilled in the relevant art will appreciate that aspects of the present disclosure can be practiced with other communications, data processing, or computer system configurations, including: Internet appliances, hand-held devices, etc.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

INDUSTRIAL APPLICABILITY

The present disclosure may find application in machines with connected GUIs implemented on one or more display screens.

The present disclosure improves existing machine GUIs by implementing the GUI with a relative coordinate system that further scales the size and location of parameter elements on one or more display screens based on parameter information, arrangement rules, and the size and resolution of the one or more display screens.

Another aspect of the above disclosure is disclosed in FIG. 4, which is an exemplary method 400 for implementing a GUI 105 connected to a power system 110 of a system 100 as disclosed in FIG. 1. As shown, the method 400 in block 410 may initially be configured to obtain a screen resolution of the display 105A of system 100. In block 415, the method 400 will determine if the resolution of the display 105A is identical to a predetermined default display screen resolution. For example, the predetermined default display screen resolution may be the display screen of another different display device previously connected to the power system 110. If the resolution of display screen 105A is identical to the predetermined default display screen resolution, the method 400 will return the GUI display to the user in block 420. If in block 415 the method 400 determines that the resolution of screen 105A is not identical to the predetermined default resolution, in block 425 the method 400 determines whether each widget (e.g. parameter element) has been scaled according to parameter information and arrangement rules. If a parameter element has not been scaled, the method 400 selects an unscaled parameter element in block 430 and then determines whether the parameter element is exempt from scaling size in block 415. If the parameter element is not exempt, the method 400 at block 440 scales the location of the widget and then in block 445 scales the size of the widget. If the parameter element is exempt, the method 400 scales the location of the widget in block 450. In either case, the method 400 then continues in block 425, where controllers 105B determines whether all parameter elements have been scaled, and if yes, returns the GUI in block 455.

It will be apparent to those skilled in the art that various modifications and variations can be made to the disclosed system without departing from the scope of the disclosure. Other embodiments of the system will be apparent to those skilled in the art from consideration of the specification and practice of the method disclosed herein. It is intended that the specification and examples be considered as exemplary only, with a true scope of the disclosure being indicated by the following claims and their equivalents.

What is claimed is:

1. A computer-implemented method for generating a display associated with a data bus for a machine, comprising:
   receiving, by one or more processors, operations data from the data bus for a generator, engine, turbine, or vehicle;
   extracting, by one or more processors, parameter information from the operations data, wherein the parameter information includes data obtained from one or more sensors associated with the generator, engine, turbine, or vehicle;
   generating, by one or more processors, a graphical user interface (GUI) based on the parameter information by:
      determining a predetermined default display screen resolution associated with the display;
      arranging a plurality of parameter elements relative to a coordinate system according to a plurality of arrangement rules, the plurality of parameter elements being determined at least in part based on the parameter information;
      scaling each parameter element of the plurality of parameter elements based on the predetermined default display screen resolution; and
      displaying the scaled plurality of parameter elements on the GUI on the display;
   determining, by the one or more processors, whether parameter information associated with at least one parameter element of the plurality of parameter elements was received from the data bus, generator, engine, turbine, or vehicle;
   upon determining that parameter information associated with at least one parameter element was not received from the data bus for the generator, engine, turbine, or vehicle, rearranging, by the one or more processors, the plurality of parameter elements based on the plurality of arrangement rules to remove the at least one parameter element of the plurality of parameter elements; and
   displaying, by the one or processors, the rearranged plurality of parameter elements on the GUI on the display.

2. The computer-implemented method of claim 1, further comprising:
   determining, by one or more processors, a display screen resolution of the display;
   determining, by one or more processors, whether the display screen resolution of the display is identical to the predetermined default display screen resolution;
   upon determining that the display screen resolution of the display is not identical to the predetermined default display screen resolution, scaling, by one or more processors, each of the parameter elements of the plurality of parameter elements based on the display screen resolution of the display to determine scaled parameter elements; and
   displaying, by the one or more processors, the scaled parameter elements on the GUI on the display.

3. The computer-implemented method of claim 1, wherein scaling each of the parameter elements of the plurality of parameter elements based on a display screen resolution of the display further comprises:
   scaling a display location of one or more parameter elements of the plurality of parameter elements.

4. The computer-implemented method of claim 1, wherein scaling each of the parameter elements of the plurality of parameter elements based on a display screen resolution of the display further comprises:
   scaling a display location of one or more parameter elements of the plurality of parameter elements; and
   scaling a size of one or more parameter elements of the plurality of parameter elements.

5. The computer-implemented method of claim 1, wherein the plurality of parameter elements comprise any one or more of a battery voltage, frequency, pre-filter oil pressure, engine oil pressure, engine load, temperature, or throttle position percentage.

6. The computer-implemented method of claim 1, wherein scaling each of the parameter elements of the plurality of parameter elements based on a display screen resolution further comprises:
   scaling each parameter element of the plurality of parameter elements according to a proportion of a pixel count associated with the display.

7. The method of claim 1, wherein one arrangement rule of the plurality of arrangement rules includes placing a first parameter element of the plurality of parameter elements adjacent to a second parameter element of the plurality of parameter elements.

8. A system for generating a display associated with a data bus for a machine, the system comprising:
   at least one data storage device storing processor-readable instructions stored therein; and
   at least one processor configured to execute the instructions stored in the data storage device to perform operations comprising:
      receiving operations data from the data bus for a generator, engine, turbine, appliance, or vehicle;
      extracting parameter information from the operations data, wherein the parameter information includes data obtained from one or more sensors associated with the generator, engine, turbine, appliance, or vehicle;
      generating a graphical user interface (GUI) based on the parameter information by:

determining a predetermined default display screen resolution associated with the display;

determining a plurality of arrangement rules associated with displaying a plurality of parameter elements, the plurality of parameter elements being determined at least in part based on the parameter information;

arranging each parameter element of the plurality of parameter elements relative to a coordinate system according to the plurality of arrangement rules;

scaling each parameter element of the plurality of parameter elements based on the predetermined default display screen resolution; and displaying the scaled plurality of parameter elements on the GUI on the display;

upon determining that parameter information associated with at least one parameter element was not received from the data bus for the generator, engine, turbine, appliance, or vehicle, rearranging the plurality of parameter elements based on the plurality of arrangement rules to remove the at least one parameter element of the plurality of parameter elements; and displaying the rearranged plurality of parameter elements on the GUI on the display.

9. The system of claim 8, the operations further comprising:

determining a display screen resolution of the display;

determining whether the display screen resolution of the display is identical to the predetermined default display screen resolution;

upon determining that the display screen resolution of the display is not identical to the predetermined default display screen resolution, scaling each of the parameter elements of the plurality of based on the display screen resolution of the display to determine scaled parameter elements; and displaying the scaled parameter elements on the GUI on the display.

10. The system of claim 8, wherein scaling each of the parameter elements of the plurality of parameter elements based on the display screen resolution of the display further comprises:

scaling a display location of one or more parameter elements of the plurality of parameter elements.

11. The system of claim 8, wherein scaling each of the parameter elements of the plurality of parameter elements based on the display screen resolution of the display further comprises:

scaling a display location of one or more parameter elements of the plurality of parameter elements; and scaling a size of one or more parameter elements of the plurality of parameter elements.

12. The system of claim 8, wherein the plurality of parameter elements comprise any one or more of a battery voltage, frequency, pre-filter oil pressure, engine oil pressure, engine load, temperature, or throttle position percentage.

13. The system of claim 8, wherein scaling each of the parameter elements of the plurality of parameter elements based on the display screen resolution further comprises:

scaling each parameter element of the plurality of parameter elements according to a proportion of a pixel count associated with the display.

14. The system of claim 8, wherein one arrangement rule of the plurality of arrangement rules includes modifying an arrangement of parameter elements based on a parameter information priority or value associated with the parameter information.

15. A non-transitory computer-readable medium for generating a display associated with a data bus for a machine, storing instructions to execute operations comprising:

receiving, by a processor, operations data from the data bus for operations data from the data bus for a generator, engine, turbine, or vehicle;

extracting, by the processor, parameter information from the operations data, wherein the parameter information includes data obtained from a sensor;

generating, by the processor, a graphical user interface (GUI) based on the parameter information by:

determining a predetermined default display screen resolution associated with the display;

arranging a plurality of parameter elements relative to a coordinate system according to two or more arrangement rules;

scaling one or more parameter elements of the plurality of parameter elements based on the predetermined default display screen resolution; and displaying the GUI on the display;

determining, by the processor, whether parameter information associated with a first parameter element was received from the data bus, generator, engine, turbine, or vehicle;

upon determining that parameter information associated the first parameter element was not received from the data bus for the generator, engine, turbine, or vehicle, rearranging, by the processor, the plurality of parameter elements based on the two or more arrangement rules to remove the first parameter element; and displaying, by the processor, the rearranged plurality of parameter elements on the GUI on the display.

16. The non-transitory computer-readable medium of claim 15, the operations further comprising:

determining, by the processor, a display screen resolution of the display;

determining, by the processor, whether the display screen resolution of the display is identical to the predetermined default display screen resolution;

upon determining that the display screen resolution of the display is not identical to the predetermined default display screen resolution, scaling, by the processor, the plurality of parameter elements based on the display screen resolution of the display to generate scaled parameter elements; and displaying, by the processor, the scaled parameter elements on the GUI on the display.

17. The non-transitory computer-readable medium of claim 15, wherein scaling the one or more parameter elements of the plurality of parameter elements based on a display screen resolution of the display further comprises:

scaling a display location of one or more parameter elements of the plurality of parameter elements.

18. The non-transitory computer-readable medium of claim 15, wherein scaling the one or more parameter elements of the plurality of parameter elements based on a display screen resolution of the display further comprises:

scaling a display location of the one or more of the parameter elements of the plurality of parameter elements; and scaling a size of the one or more parameter elements of the plurality of parameter elements.

19. The non-transitory computer-readable medium of claim 15, wherein scaling the one or more parameter elements of the plurality of parameter elements based on a display screen resolution further comprises:

scaling each of the one or more parameter elements of the plurality of parameter elements according to a proportion of a pixel count associated with the display.

20. The non-transitory computer-readable medium of claim 15, wherein the plurality of parameter elements comprise any one or more of a battery voltage, frequency, pre-filter oil pressure, engine oil pressure, engine load, temperature, or throttle position percentage.

* * * * *